(12) United States Patent
Morgan et al.

(10) Patent No.: US 9,174,155 B2
(45) Date of Patent: *Nov. 3, 2015

(54) AIR FILTER WITH BALANCED SEAL

(71) Applicant: CAMFIL USA, INC., Riverdale, NJ (US)

(72) Inventors: Lee Pendleton Morgan, Jonesboro, AR (US); Tim Hudson, Jonesboro, AR (US)

(73) Assignee: CAMFIL USA, INC., Riverdale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/187,258

(22) Filed: Feb. 22, 2014

(65) Prior Publication Data

US 2014/0237958 A1      Aug. 28, 2014

Related U.S. Application Data

(63) Continuation of application No. 13/275,832, filed on Oct. 18, 2011, now Pat. No. 8,673,037.

(51) Int. Cl.
| | | |
|---|---|---|
| *B01D 46/00* | (2006.01) | |
| *B01D 46/24* | (2006.01) | |
| *B01D 46/02* | (2006.01) | |
| *B01D 46/42* | (2006.01) | |

(52) U.S. Cl.
CPC .......... *B01D 46/0005* (2013.01); *B01D 46/008* (2013.01); *B01D 46/02* (2013.01); *B01D 46/2411* (2013.01); *B01D 46/4227* (2013.01); *B01D 2271/022* (2013.01)

(58) Field of Classification Search
CPC .......... B01D 46/0005; B01D 46/2411; B01D 46/4227; B01D 26/02; B01D 46/008
USPC ......... 55/341.1, 378, 480, 493, 498, 502, 529
See application file for complete search history.

(56) References Cited

U.S. PATENT DOCUMENTS

| | | | |
|---|---|---|---|
| 4,322,231 A | | 3/1982 | Hilzendeger et al. |
| 4,746,339 A | * | 5/1988 | Millard ........................ 55/302 |
| 5,156,660 A | | 10/1992 | Wilson |
| 5,290,441 A | | 3/1994 | Griffin et al. |

(Continued)

FOREIGN PATENT DOCUMENTS

| | | |
|---|---|---|
| EP | 1889648 A2 | 2/2008 |
| WO | 2011/069508 A1 | 6/2011 |
| WO | WO-2011/069508 A1 | 6/2011 |

OTHER PUBLICATIONS

HemiPleat™ Tenkay® Cartridge for Tenkay Mark III and IV Collectors Data Sheet—FARR Air Pollution Control, FARR APC, Dec. 2005.

(Continued)

*Primary Examiner* — Duane Smith
*Assistant Examiner* — Minh-Chau Pham
(74) *Attorney, Agent, or Firm* — Patterson & Sheridan, LLP

(57) ABSTRACT

An air filter and dust collector are provided. In one embodiment, the air filter includes a filter element coupled at a first end to a end cap and at a second end to a first side of a rectangular filter flange assembly. The rectangular filter flange assembly includes a central aperture open to an interior region bounded by the filter element. A rectangular gasket is disposed on the second side of the filter flange assembly and circumscribes the central aperture.

20 Claims, 8 Drawing Sheets

(56) References Cited

U.S. PATENT DOCUMENTS

| | | | |
|---|---|---|---|
| 5,746,796 | A | 5/1998 | Ambs et al. |
| 5,803,954 | A | 9/1998 | Gunter et al. |
| 5,961,696 | A * | 10/1999 | Gombos ............... 95/273 |
| 5,972,059 | A | 10/1999 | Morgan |
| 5,989,421 | A | 11/1999 | Davis et al. |
| 6,203,591 | B1 | 3/2001 | Clements et al. |
| 6,245,130 | B1 | 6/2001 | Maybee et al. |
| 6,613,115 | B2 | 9/2003 | Moore |
| 6,676,721 | B1 | 1/2004 | Gillingham et al. |
| 7,247,183 | B2 | 7/2007 | Connor et al. |
| 7,341,613 | B2 | 3/2008 | Kirsch |
| 8,157,878 | B2 | 4/2012 | Weber et al. |
| 8,673,037 | B2 * | 3/2014 | Morgan et al. ............ 55/341.1 |
| 2002/0020160 | A1 | 2/2002 | Moore |
| 2005/0126137 | A1 | 6/2005 | Wang |
| 2008/0092501 | A1 | 4/2008 | Sporre et al. |
| 2008/0127825 | A1 | 6/2008 | Raether |
| 2010/0037570 | A1 | 2/2010 | Osendorf et al. |
| 2010/0263344 | A1 | 10/2010 | Haynam et al. |
| 2011/0185689 | A1 | 8/2011 | Raether et al. |

OTHER PUBLICATIONS

PCT international search report and written opinion of PCT/US2012/051584 dated Jan. 22, 2013.
Prosecution history of U.S. Appl. No. 13/275,832 as of Mar. 10, 2014
Partial Supplemental European Search Report, EP Application No. 12842366.2, Publication 2768599, May 8, 2015.
Office Action with Search Report, CN Aplication No. 201280062561.3, Feb. 2, 2015.

* cited by examiner

AIR FILTER WITH BALANCED SEAL

This application is a continuation of U.S. patent application Ser. No. 13/275,832, filed Oct. 18, 2011, now U.S. Pat. No. 8,673,037 B2, which is incorporated by reference in its entirety.

BACKGROUND

1. Field

The present invention relates to an air filter having a balanced seal and a dust collector for use with same.

2. Description of the Related Art

In many dust collecting systems, an air filter with a rectangular flange is employed. The rectangular flange extends beyond the periphery of the air filter and provides a surface for mounting the air filter to the dust collector. The air filter is mounted to the dust collector by clamping the air filter to a tube sheet disposed in the dust collector which separates dirty and clean air plenums. Dirty air entering the dirty air plenum of the dust collector passes through the air filter to remove particulate entrained in the dirty air. The filtered air exits the air filter and passes through a hole in the tube sheet into the clean air plenum, from which the filtered clean air is exhausted to atmosphere from the dust collector. The air filter is sealed to the tube sheet by means of a clamp which engages the flange of the air filter. In many systems, the clamping mechanism comprises two parallel clamping bars which may be actuated toward the tube sheet, thereby engaging the flange and compressing a gasket mounted to the flange against the tube sheet, thereby creating a seal between the air filter and the tube sheet. To provide good engagement between the clamping mechanism and the flange of the air filter, the flange is typically square or rectangular.

FIG. 1 illustrates a top perspective view of a conventional air filter 100. The air filter 100 includes a cylindrical filter element 110 bounded by an end cap 106 at a first end and a rectangular flange 104 at a second end. The rectangular flange 104 is shown in FIG. 1 as having two short edges 112 and two long edges 114. The rectangular flange 104 includes an aperture 120 to allow air passing through the filter element 110 to exit the filter 100 and a ring shaped recessed channel 130 for receiving the filter element 110.

At least one circular gasket 108 is coupled to the rectangular flange 104 generally on the backside of the recessed channel 130, which is located well inward of the perimeter of the rectangular flange 104. The gasket 108 closely circumscribes the aperture 120 to seal the filter 100 against a mounting surface (not shown FIG. 1). The circular gasket 108 is laterally well spaced from an edge 112 of the flange 104; generally directly above the filter element 110 potted in the recessed channel 130.

The filter 100 is conventionally secured to the mounting surface applying a force to an area 116 located immediately along the long edges 114 of the flange 104. In FIG. 1, the area 116 extends about 1-2 inches inward from the long edges 114 of the flange 104, as shown by imaginary dashed lines 122. As a result, as the clamping mechanism engages the area 116 of the flange 104 along the long edges 114, the clamping force must be transferred laterally through the flange 104 to the gasket 108. As a result, the gasket 108 is loaded non-uniformly which may contribute to potential leakage. For example, a region 118 of the gasket 108 closest to the short edges 112 has less loading then a region 124 of the gasket closest to the long edges 114. Additionally, the offset between the area 116 that clamping force is applied to the location when the gasket 108 is loaded may cause the flange 104 to further deflect along the short edges 112, further contributing to non-uniformity of the sealing force applied to the gasket 108 and further increasing the potential for air bypassing the filter 100.

Therefore, there is a need for an improved air filter with a balance seal which improves the uniformity of the clamping force.

SUMMARY

An air filter and dust collector are provided. In one embodiment, the air filter includes a filter element coupled at a first end to a end cap and at a second end to a first side of a rectangular filter flange assembly. The rectangular filter flange assembly includes a central aperture open to an interior region bounded by the filter element. A rectangular gasket is disposed on the second side of the filter flange assembly and circumscribes the central aperture.

In another embodiment, a dust collector includes a housing having an inlet, an outlet, and a filter access port sealable by a door. A tube sheet is disposed within the housing. The tube sheet separates a dirty air plenum from a clean air plenum within the housing. The tube sheet has at least one rectangular filter aperture formed therethrough allowing fluid communication between the dirty air plenum and the clean air plenum. A mounting mechanism is disposed in the housing and is operable to clamp a filter flange assembly of an air filter to the tube sheet such that the outlet of the air filter aligns with the rectangular filter aperture.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
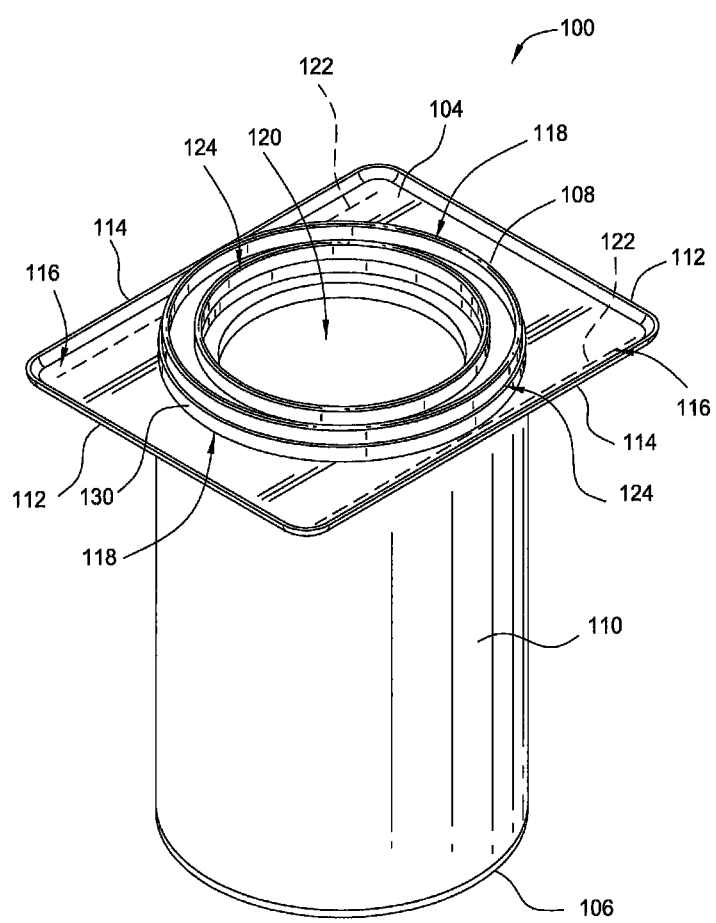
FIG. 1 is a top perspective view of a conventional air filter known in the art.
Figure 2:
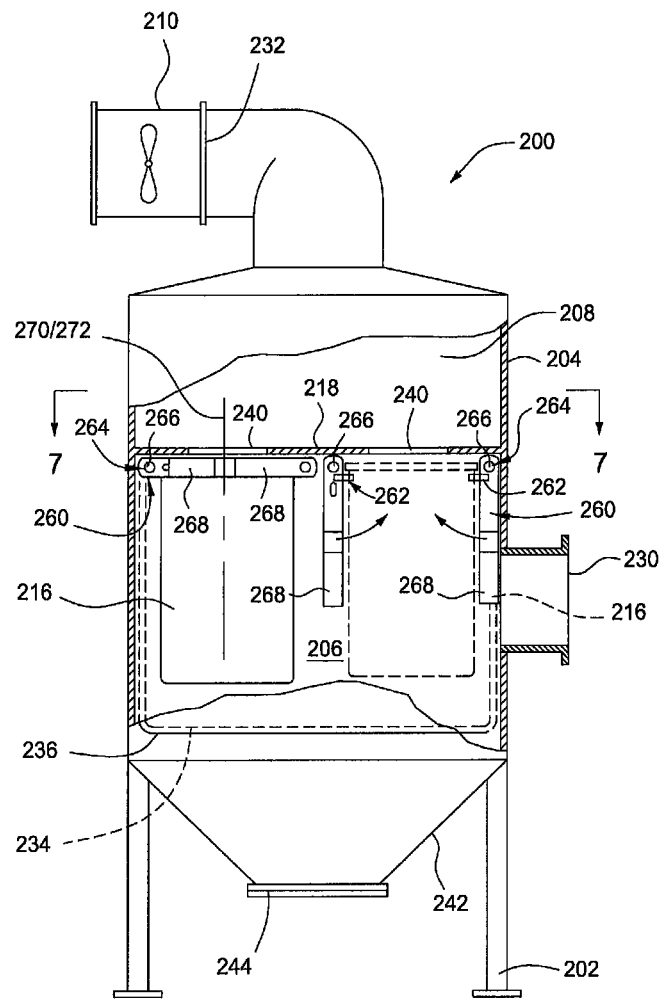
FIG. 2 is a partial cut away elevation of one embodiment of a dust collector having at least one air filter disposed therein.

FIG. 2 is a partial cut away elevation of one embodiment of a dust collector 200 having at least one replaceable air filter 216. Although the replaceable air filter 216 is illustrated used in an exemplary embodiment of the dust collector 200, it is contemplated that all embodiments of the air filters described herein may be utilized in dust collectors of varying designs from different manufactures.

Figure 7:
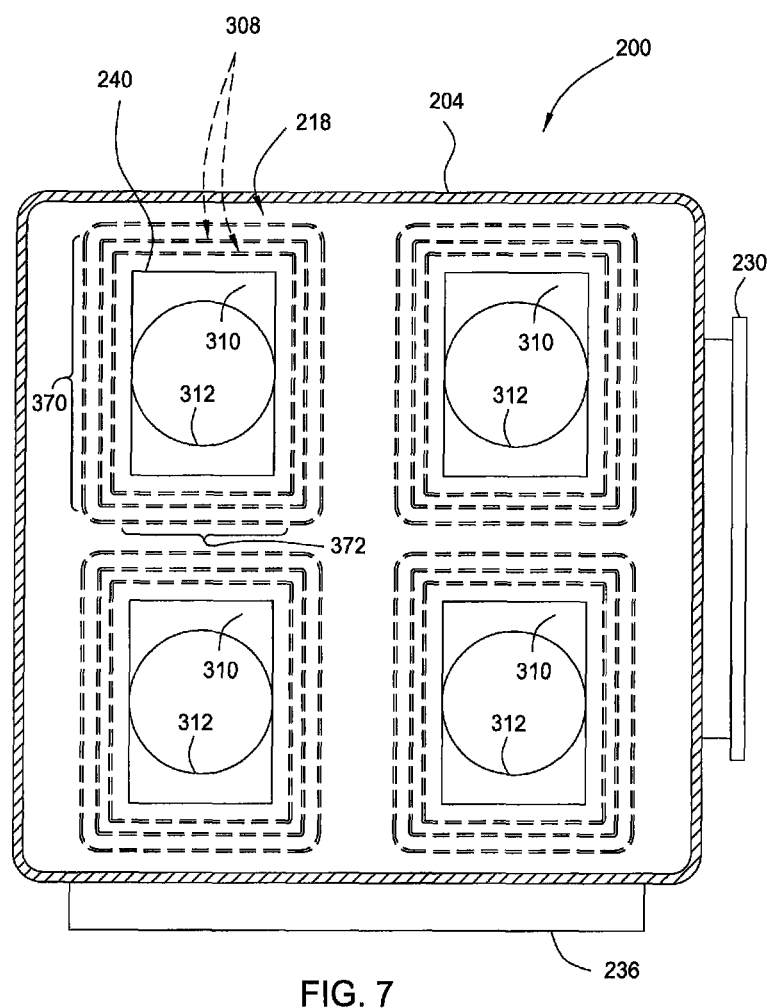
FIG. 7 is a partial sectional view of the dust collector of FIG. 2 taken along section line 7-7 of FIG. 2.

The dust collector 200 includes a housing 204 that is coupled to an air mover 210, such as a fan or blower, for drawing air through the at least one replaceable air filter 216 mounted in the housing 204. The air mover 210 may be mounted to or be remote from the housing 204. The housing 204 is constructed from a rigid material suitable to withstand the operational pressures and loading for which the particular dust collector is designed. The housing 204 includes an inlet 230, an outlet 232 and a filter access port 234 (partially shown in phantom) sealable by a filter access door 236. The filter access door 236 may be opened to replace the at least one replaceable air filter 216 disposed in the housing 204 and closed to sealingly isolate the interior of the housing from the surrounding environment. The housing 204 is supported by legs 202 and includes a tube sheet 218 which separates the interior of the housing 204 into a dirty air plenum 206 and a clean air plenum 208. The dirty air plenum 206 is in communication with the inlet 230 of the housing 204 while the clean air plenum 208 is in communication with the outlet 232 of the housing 204. The at least one air filter 216 is sealingly mounted to the tube sheet 218 such that air moving passing through a filter aperture 240 formed through the tube sheet 218 from the dirty air plenum 206 to the clean air plenum 208 must first pass through the at least one air filter 216. The filter aperture 240 may have any suitable geometry, and preferably is rectangular as shown in the sectional view of the dust collector 200 shown in FIG. 7 to allow greater tolerance for misalignment between a centerline 270 of the air filter 216 and a centerline 272 of the filter aperture 240. The centerline 270 of the air filter 216 and the centerline 272 of the filter aperture 240 are shown in co-linear alignment in FIG. 2. The greater tolerance for misalignment between the air filter 216 and the filter aperture 240 advantageously minimizes the probability of the air filter 216 blocking a portion of the filter aperture 240 which would result in higher operational pressure and undesirable increase in energy consumption.

Not shown in FIG. 2, the dust collector 200 may optionally includes a filter cleaning system which is operable to remove at least a portion of the dust cake formed on the air filter 216 during operation. The filter cleaning system may vibrate, shock or utilized air jets to knock at least a portion of the dust cake formed on the air filter into a collection hopper 242 formed in the lower portion of the housing 204. The collection hopper 242 includes a door 244 which may be periodically opened to remove the dust or other filtered materials from the dust collector 200.

Each air filter 216 is sealingly mounted to the tube sheet 218 by a mounting mechanism 260. Many different types of mounting mechanism 260 are commonly known in the art, any of which may be employed in the housing 204. In the exemplary embodiment depicted in FIG. 2, the mounting mechanism 260 includes a pair of bars 262 coupled by actuators 264 to one of the housing 204 or tube sheet 218. The actuators 264 are operable to move the bars 262 selectively towards and away from the tube sheet 218. When the bars 262 are moved to a closed position towards the tube sheet 218, the air filter 216 is sealingly pushed against the tube sheet 218. When the bars 262 are moved to an open position away from the tube sheet 218, the air filter 216 is spaced from the tube sheet 218 thereby allowing removal of the air filter 216 through the filter access port 234.

In the embodiment depicted in FIG. 2, the actuator 264 of the mounting mechanism 260 includes a cam member 266 and a lever 268. The lever 268 may be actuated, for example, by motor, cylinder, by hand or other suitable means, between a first portion which rotates the cam member 266 to an orientation that displaces the bar 262 towards the tube sheet 218 (i.e., the closed position) and a second portion which rotates the cam member 266 to an orientation that displaces the bar 262 away from the tube sheet 218 (i.e., the open position). In the illustration of the dust collector 200 depicted in FIG. 2, the mounting mechanism 260 on the left side of the housing 204 is shown in the closed position clamping the air filter 216 against the tube sheet 218 while the mounting mechanism 260 on the right side of the housing 204 is shown in the open position spacing the bar 262 from the tube sheet 218 to facilitate loading a replacement air filter 216 (shown in phantom on the right hand side).

Figure 3:
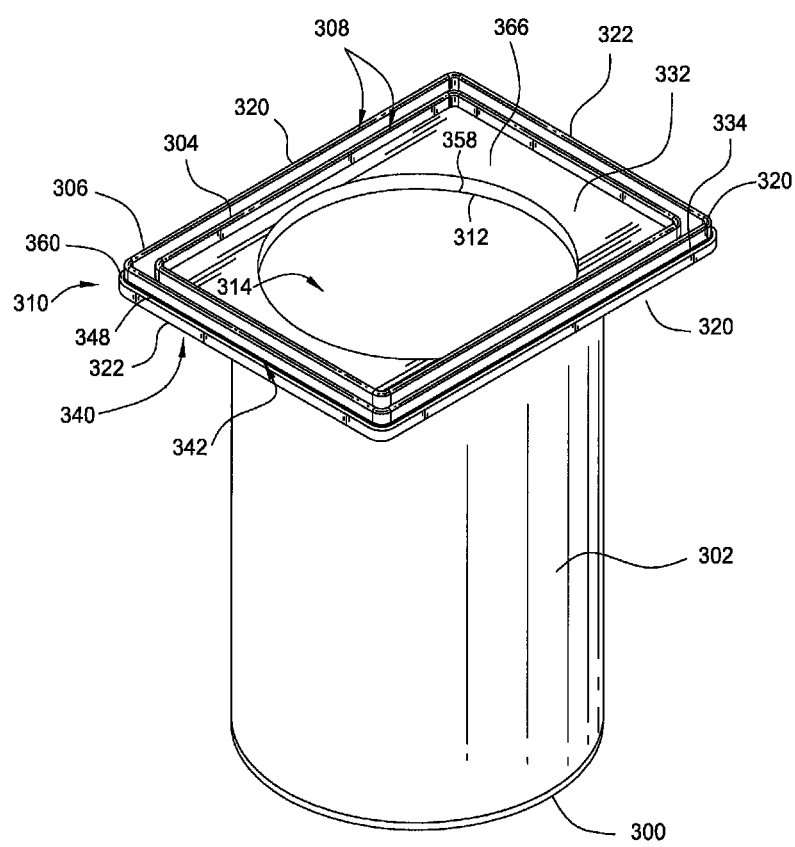
FIG. 3 is a top perspective view of one embodiment of the air filter of FIG. 2.
Figure 4:
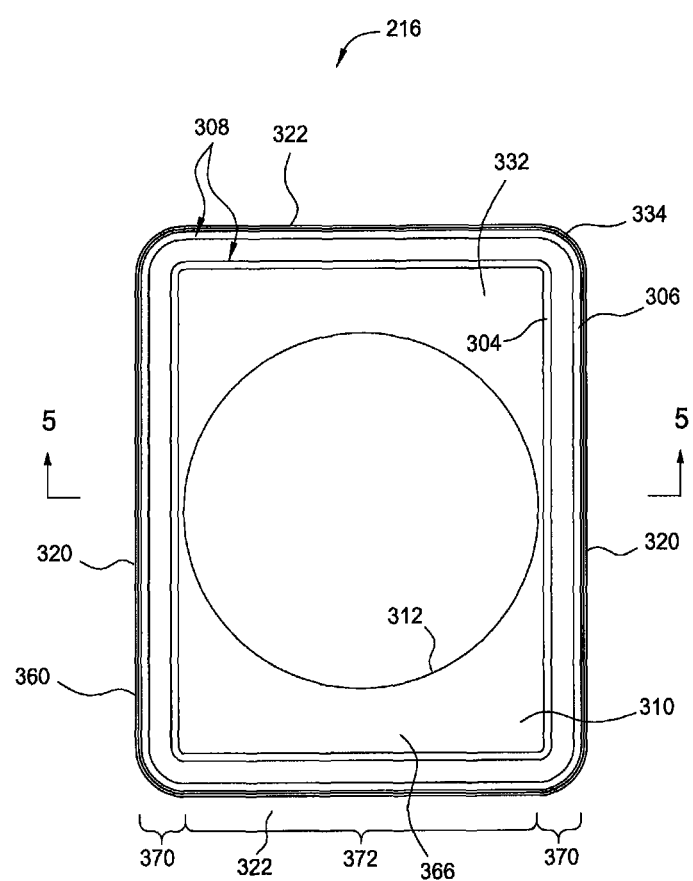
FIG. 4 is a top view of the air filter of FIG. 2.
Figure 5A:
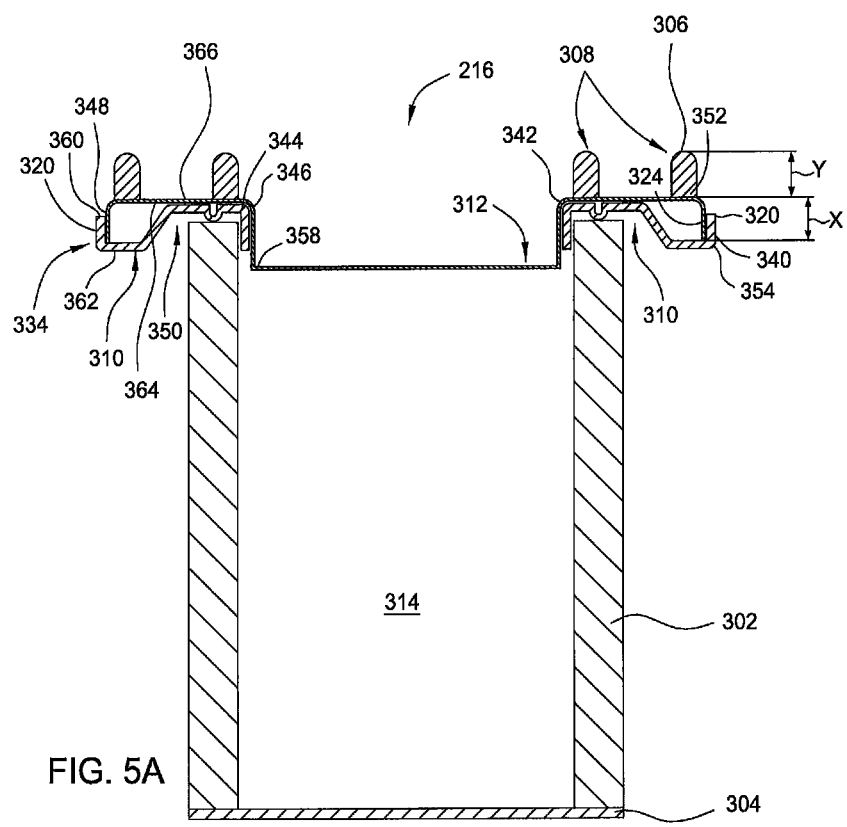
FIG. 5A is cross-sectional view of the air filter of FIG. 2 taken along section line 5-5 of FIG. 4.

FIGS. 3, 4, and 5A are top perspective, top and cross-sectional views of one embodiment of the air filter 216. The air filter 216 includes a tubular filter element 302, an end cap 300 and a filter flange assembly 310. The filter flange assembly 310 includes a top surface 352 and a bottom surface 354, defining the upper-most and lower-most surfaces of the filter flange assembly 310. The filter flange assembly 310 also includes at least one perimeter gasket 308. The top and bottom surfaces 352, 354 may be part of a one piece unitary component of a filter flange assembly as illustrated by flange 502 of a filter flange assembly 550 illustrated in FIG. 5B, or as a multi-piece component of the filter flange assembly 310, as shown in FIG. 5A. In the embodiment depicted in FIG. 5A, the filter flange assembly 310 comprises of a second flange 340 and a first flange 342. The second flange 340 may include a recessed channel 350, a second flange aperture 344, a top surface 360, and a bottom surface 362, wherein the bottom surface 362 of the second flange 340 defines the bottom surface 354 of the filter flange assembly 310. The first flange 342 include an inner lip 358, a first flange aperture 346, an outer lip 348, a bottom surface 364, and a top surface 366, wherein the top surface of the first flange 342 defines the top surface 352 of the filter flange assembly 310. The outer lip 348 of the first flange 342 is radially well outward of the recessed channel 350 of the second flange 340, and adjacent, i.e., near, the perimeter of the second flange 340.

The first and second flanges 342, 340 may be coupled together by any suitable method, for example welding, bonding, fastening or press-fitting, among other joining methods. In the embodiment depicted in FIG. 3, the flanges 340, 342 are press-fit together. For example, the inner lip 358 extends from the bottom surface 364 of the first flange 342 and is press-fit into the second flange aperture 344 of the second flange 342. The outer lip 348 extending from the bottom surface 364 of the first flange 342 abuts the top surface 360 of the second flange 340, thus maintaining the top surface 352 and bottom surface 354 of the filter flange assembly 310 in a spaced apart relation "X" between about ⅜ inches to ⅝ inches, for example ½ inches. The spaced apart relationship X of the top and bottom surfaces 352, 354 advantageously allows a shorter gasket 308 to be utilized. Tall, e.g. high aspect ratio, gaskets are difficult to form and provide unreliable seals. Thus, the spaced apart relation X of the top and bottom surfaces 352, 354 allows the height of the gasket 308 to be maintained at conventional aspect ratios having proven reliability. Moreover, since the top surface 352 defined by the top surface 366 of the first flange 340 extends well beyond the area above the recessed channel 350, the gasket 308 may be positioned well outward of the recessed channel 350 and filter element 302 to provide a more balanced seal as further described below.

The filter flange assembly 310 may have a rectangular outer edge 334, although other geometries may be utilized. The rectangular outer edge 334 facilitates use of multiple air filters 216 arranged in an array to be located accurately within the duct collector 200 with minimal effort or hardware. As illustrated in the top view of the air filter 216 depicted in FIG. 3, the rectangular outer edge 334 of the filter flange assembly 310 includes long edges 320 adjacent to short edges 322. The gasket 308 is immediately adjacent the long edges 320. The outer edge 334 may also include an outer lip 324 extending out of the plane of the filter flange assembly 310 away from the tubular filter element 302 to increase the rigidity of the filter flange assembly 310. It is contemplated that the outer lip 324 of the second flange 340 may be secured to the outer lip 348 of the first flange 342.

The tubular filter element 302 may be formed from pleated filter media selected to provide the pressure drop and efficiency desired for the designed operating parameters of the dust collector 200. The filter media may be woven or non-woven filtration material, including wet-laid, meltblown, air-laid, needled, and composite filter media, among others. Filter media suitable for fabricating the tubular filter element 302 is well known and widely available, for example, from suppliers such as Hollingsworth & Vose Company, Lydall, Inc., and the like.

The end cap 300 is generally a disk to which one open end of the tubular filter element 302 is secured by an adhesive. Adhesives suitable for the tubular filter element 302 to the end cap 300 include polyurethanes and silicone adhesives. In one embodiment, the tubular filter element 302 is potted to the end cap 300 to prevent air from leaking therebetween.

The other open end of the tubular filter element 302 is secured in the recessed channel 350 formed in the bottom surface 354 of the filter flange assembly 310 also by an adhesive. The same adhesives may be used for securing the tubular filter element 302 to the filter flange assembly 310 as described above. In one embodiment, the tubular filter element 302 is potted to the filter flange assembly 310 to prevent air from leaking therebetween.

The filter flange assembly 310 also includes a central aperture 312. In the embodiment depicted in FIG. 5A, the inside diameter of the inner lip 358 defines the central aperture 312. The central aperture 312 is open to an interior region 314 of the air filter 216 bounded by the tubular filter element 302. Thus, air passing through the tubular filter element 302 into the interior region 314 is directed out of the air filter 216 through the central aperture 312 formed in the filter flange assembly 310. The central aperture 312 generally is circular in geometry, and of sufficient diameter as to not add pressure drop of air passing through the air filter 216 at designed air flow rates, which are typically around 100 feet per second of face velocity.

The at least one perimeter gasket 308 is secured to the top surface 352 of the filter flange assembly 310 to seal against the tube sheet 218 during use. The gasket 308 may be an elastomeric material, such as silicone, neoprene, butyl, nitrile, ethylene propylene and the like. The gasket 308 may be affixed to the second side 332 of the filter flange assembly 310 by a pressure sensitive adhesive or, alternatively, poured in place.

The perimeter gasket 308 located very close to an outer edge 334 of the filter flange assembly 310 and circumscribes the central aperture 312. In one embodiment, the gasket 308 has a height between about ½ inches to ¾ inches, for example ⅝ inches. As illustrated in the embodiment depicted in FIG. 3, the perimeter gasket 308 is disposed substantially equidistant from both the short and long edges 322, 320 of the filter flange assembly 310. In one embodiment, two or more perimeter gaskets 308 may be utilized, such as an inner and outer perimeter gaskets identified by reference numerals 304, 306.

Figure 5B:
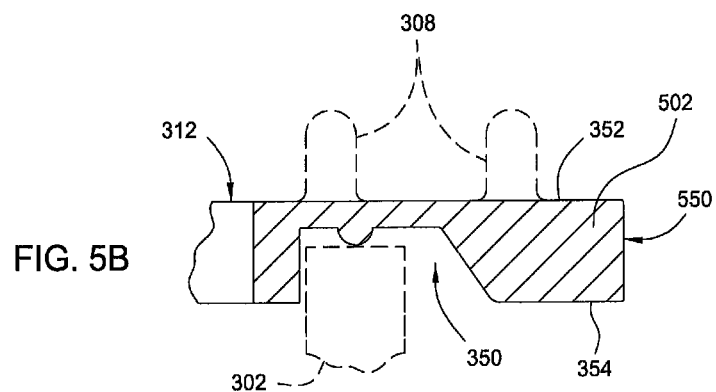
FIG. 5B is a cross-sectional view of one embodiment of the air filter of FIG. 2 taken along section line 5-5 of FIG. 4.

The perimeter position of the gasket 308 is enabled by the radial expanse of the top surface 352, which in the embodiments is depicted in both FIGS. 5A-5B, and is created by the top surface 352 not being confined to only the region directly above the recessed channel found in conventional designs fabricated using single element sheet metal flanges. For example, since the perimeter of the first flange 342 extends well beyond to radial bounds of the recessed channel 350 to a location very close to the outer edge 334 of the filter flange assembly 310, the gasket may be positioned very close to the outer edge 334. The benefits of this perimeter location of the gasket 308 are best described with reference to FIG. 6 below.

Figure 6:
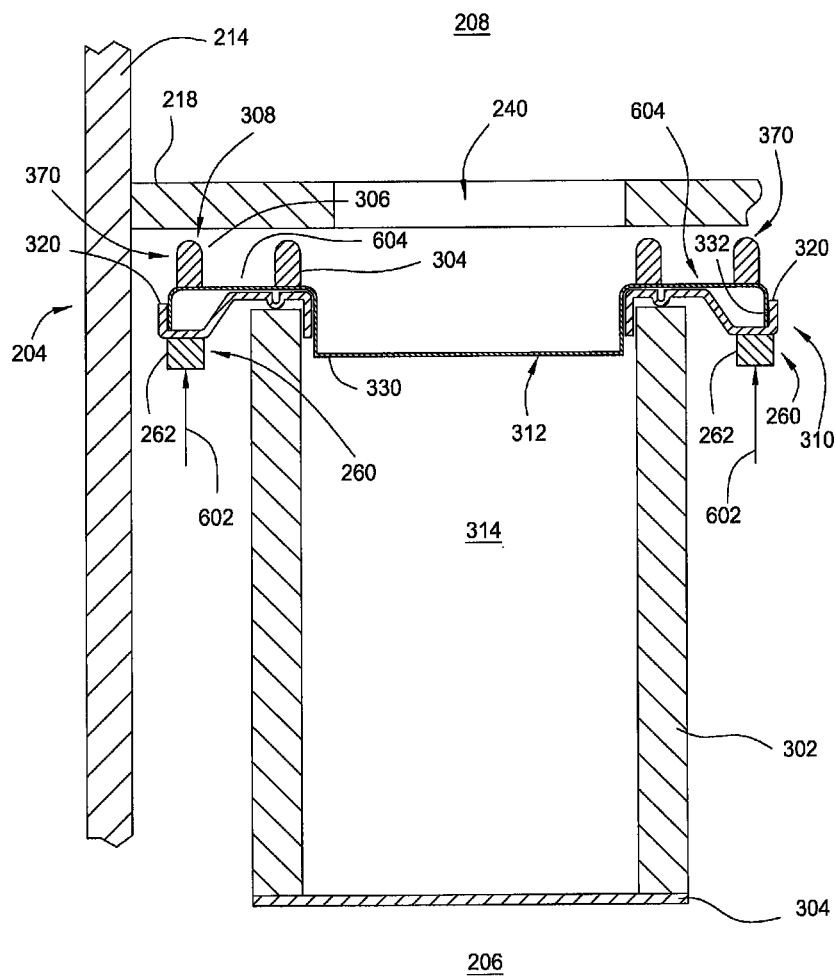
FIG. 6 is a partial cross-sectional view of the dust collector of FIG. 2 detailing the air filter sealing interface.

FIG. 6 is a partial cross-sectional view of the dust collector of FIG. 2 detailing the air filter sealing interface between the tube sheet 218 and the filter flange assembly 310. As the perimeter gasket 308 is located along the entire long edge 320 of the filter flange assembly 310 and in an area 604 of filter flange assembly 310 in which the bar 262 of the mounting mechanism 260 contacts the filter flange assembly 310, the force urging the filter flange assembly 310 towards against the tube sheet 218 applied by the actuator 264 is linearly aligned with the gasket 308 (i.e., the bar 262, gasket 308 and tube sheet 218 are linearly co-aligned with the motion of the bar 262, as illustrated by arrows 602) thereby applying a uniform compression force to a portion 370 of the gasket 308 aligned with the long edge 320 without generating a cantilever force on the filter flange assembly 310 which could reduce the force applied to a portion 372 of the gasket 308 aligned with the short edge 322 of the filter flange assembly 310. The substantial elimination of the cantilever force on the filter flange assembly 310 substantially decreases the variance in the compression force to the portion 372 of the gasket 308 aligned with the short edge 322 of the filter flange assembly 310 because the filter flange assembly 310 is much less likely to deflect as compared to conventional designs, thereby resulting in a much more robust and reliable air filter 216 to tube sheet 218 seal. Additionally, as the sealing forces is more uniformly distributed on the gasket 308, less sealing force is needed, thereby allowing for lighter and less expensive mounting mechanisms 260. As an additional benefit, the location of the gasket 308 uniformly adjacent the outer edge 334 of the filter flange assembly 310 reduces the area of the second side 332 the filter flange assembly 310 exposed to the dirty air plenum 206, thereby reducing the amount of dust or other particulate matter which can collect on the second side 332 the filter flange assembly 310 during use which creates a mess during filter exchange.

Figure 8:
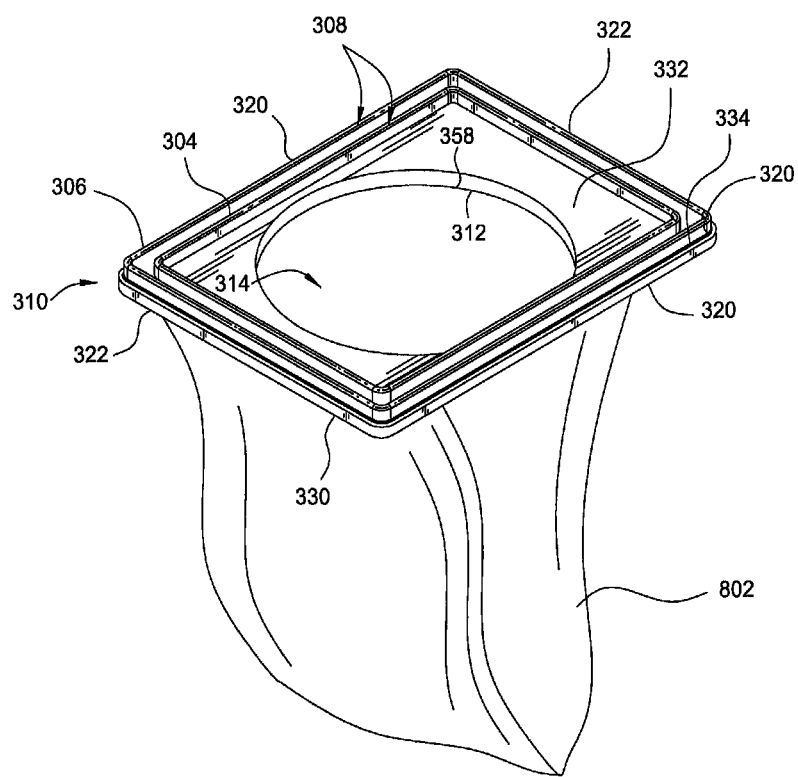
FIG. 8 is front sectional view of another embodiment of an air filter.

FIG. 8 is a front perspective view of another embodiment of an air filter 800 with may be utilized with the dust collector 200, among others. The air filter 800 is similar to the air filter 216 described above, having a filter flange assembly 310 and gasket 308 that provide the beneficial sealing attributes, except in that the air filter 800 includes a bag filter element 802 instead of a tubular filter element 302.

Thus, an air filter having a rectangular perimeter gasket uniformly following an edge of the filter flange has been provided that provides uniform and balanced sealing forces. The uniform and balanced sealing forces improve sealing between the air filter and dust collector, thereby improving the performance of a dust collector utilizing such filters. Additionally, a dust collector is provided that has increased tolerance for mismatched alignment between the air filter and dust collector, thereby making the dust collector less susceptible to increased pressure lose and power consumption due to filter misalignment.

While the foregoing is directed to embodiments of the present disclosure, other and further embodiments of the disclosure may be devised without departing from the basic scope thereof, and the scope thereof is determined by the claims that follow.

What is claimed is:

1. An air filer, comprising:
    an end cap;
    a filter element coupled at a first end to the end cap;
    a rectangular filter flange having a central aperture open to an interior region bounded by the filter element, wherein the filter flange has a bottom surface, and wherein a second end of the filter element is coupled to the bottom surface of the filter flange; and
    a first gasket disposed on a top surface of the filter flange, in a position radially outward of the filter element.

2. The air filter of claim 1, wherein the rectangular filter flange comprises:
    a pair of short edges and a pair of long edges, wherein the gasket is immediately adjacent the long edges.

3. The air filter of claim 1, wherein the gasket is rectangular.

4. The air filter of claim 1, wherein the filter element is cylindrical.

5. The air filter of claim 1, wherein the filter element is a bag.

6. The air filter of claim 1, wherein the rectangular filter flange comprises:
    a recessed channel formed in the bottom surface for receiving the filter element.

7. The air filter of claim 6, wherein the first gasket is positioned radially outward of the recessed channel.

8. The air filter of claim 1, further comprising:
    a second gasket disposed on a top surface of the filter flange, in a position co-planar with the first gasket.

9. The air filter of claim 1, wherein the top surface is spaced from the bottom surface of the filter flange by at least 3/8 inches.

10. A dust collector comprising:
    a housing having an inlet, an outlet, and a filter access port sealable by a door;
    a tube sheet separating a dirty air plenum from a clean air plenum within the housing, the tube sheet having at least one rectangular filter aperture;
    a mounting mechanism disposed in the housing an operable to clamp a filter flange assembly of an air filter to the tube sheet such that the outlet of the air filter aligns with the rectangular filter aperture.

11. The dust collector of claim 10, wherein the mounting mechanism comprises:
    a pair of bars disposed on either side of the at least one rectangular filter aperture; and
    an actuator coupled to each bar.

12. The dust collector at claim 11, wherein the actuator of the mounting mechanism comprises:
    a lever; and
    a cam member co led to the lever and the bar.

13. The dust collector of claim 10, wherein the at least one rectangular filter aperture of the tube sheet comprises:
    an array of rectangular filter apertures, wherein at least two rectangular filter apertures are associated with each mounting mechanism.

14. The dust collector of claim 11, wherein the at least one rectangular filter aperture of the tube sheet comprises:
    an array of rectangular filter apertures, wherein at least two rectangular filter apertures are disposed between each pair of bars.

15. The dust collector of claim 10 further comprising:
    at least one air filter comprising:
        an end cap;
        a filter element coupled at a first end to the end cap;
        a rectangular filter flange having a central aperture open to an interior region bounded by the filter element, wherein the filter flange has a bottom surface, and wherein a second end of the filter element is coupled to the bottom surface of the filter flange; and
        a gasket disposed on a top surface of the filter flange, in a position radially outward of the filter element.

16. The dust collector of claim 15, wherein the at least one air filter further comprises:
    a recessed channel formed in the bottom surface for receiving the filter element, wherein the filter element is positioned radially outward of the recessed channel.

17. The dust collector of claim 15, wherein the gasket is rectangular.

18. The dust collector of claim 17, wherein the two sides of the gasket are directly between the tube sheet and a pair of bars disposed on either side of the at least one rectangular filter aperture.

19. The dust collector of claim 18, wherein the filter element is cylindrical.

20. The dust collector of claim 18, wherein the filter element is a bag.

* * * * *

UNITED STATES PATENT AND TRADEMARK OFFICE
CERTIFICATE OF CORRECTION

PATENT NO.         : 9,174,155 B2
APPLICATION NO.    : 14/187258
DATED              : November 3, 2015
INVENTOR(S)        : Lee Pendleton Morgan et al.

It is certified that error appears in the above-identified patent and that said Letters Patent is hereby corrected as shown below:

In the Claims:

Column 7, claim 1, line 11 please change "An air filer," to "An air filter,".

Signed and Sealed this
Twenty-third Day of August, 2016

Michelle K. Lee
*Director of the United States Patent and Trademark Office*